(No Model.)

S. DEWELL.
GEODOMETER.

No. 281,468. Patented July 17, 1883.

WITNESSES:
C. Neveux
C. Sedgwick

INVENTOR:
S. Dewell
BY Munn & Co
ATTORNEYS.

UNITED STATES PATENT OFFICE.

SAMUEL DEWELL, OF RIVER SIOUX, IOWA.

GEODOMETER.

SPECIFICATION forming part of Letters Patent No. 281,468, dated July 17, 1883.

Application filed February 19, 1883. (No model.)

*To all whom it may concern:*

Be it known that I, SAMUEL DEWELL, of River Sioux, in the county of Harrison and State of Iowa, have invented a new and Improved Geodometer, of which the following is a full, clear, and exact description.

The object of my invention is to provide a new and improved device for measuring and automatically recording distances.

The invention consists in the combination, with a wheel journaled between two shafts, of an odometer which records the number of revolutions of the wheel, which has its rim divided into equal parts and has one spoke colored different from the rest.

The invention further consists in two arms pivoted to the above-mentioned shafts, and connected by a transverse board, which arms serve as handles when the instrument is in use and as a support when at rest.

The invention also consists in various combinations of parts, as will be fully set forth and described hereinafter.

Reference is to be had to the accompanying drawings, forming part of this specification, in which similar letters of reference indicate corresponding parts in both the figures.

Figure 1:
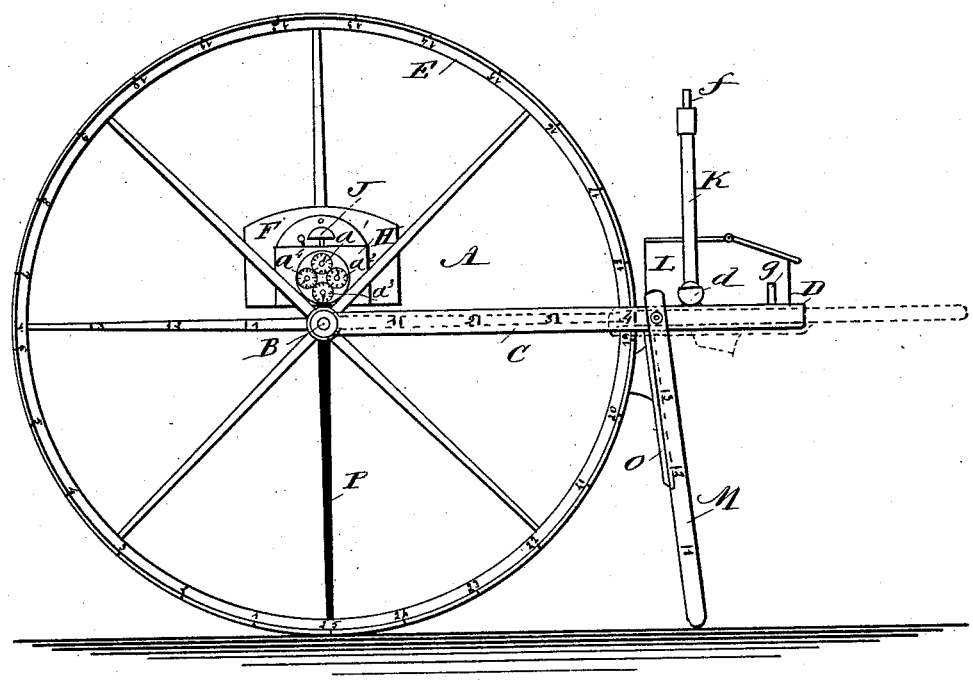
Figure 2:
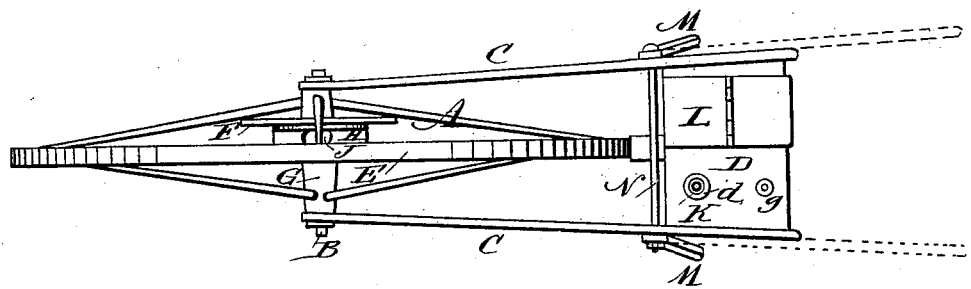

Figure 1 is a longitudinal elevation of my improved geodometer. Fig. 2 is a plan view of the same.

A wheel, A, having a circumference of one rod, is journaled on a transverse shaft, B, held in the ends of the two shafts or side bars, C, which are united at the opposite ends by a transverse board, D, whereby a forked frame is formed, in the free end of which the wheel A is journaled. The rim on felly E of the wheel is divided into twenty-five equal parts, each one link long, and the several subdivisions are marked and numbered on the inside of the rim in such a way that they can be read by the surveyor while he is propelling the machine. Between the inner ends of the spokes of the wheel a board, F, is secured on the hub G, and to the said board a pendulum or weight odometer, H, of the usual construction, is fastened, which odometer is provided with four dials, $a'$ $a^2$ $a^3$ $a^4$, and with a gong or bell, J, which is operated on by the machinery of the odometer and sounded at the end of each twenty rods, or a surveyor's out or tally, or just at the time when the pointer on the dial $a'$ performs its complete revolution. On the board D a standard, $k$, is attached, upon the top of which the ball and socket $f$ of any compass staff or tripod may be placed to suit the compass in use. A pin, $g$, projects from the board D, for the purpose of holding the compass when not in use. A box, L, is secured on the board D, for receiving note-books, tape-lines, and other small articles used for surveying and belonging to the machine.

To each arm C an arm, M, is pivoted by means of a transverse rod, N, between the wheel and the board D, and the said arms M are connected directly below their pivoted ends by a transverse board, O. Said board rests against the rim or felly E of the wheel A, when standing, forming a lock or brake to keep the wheel from turning, especially while stopping in going up or down hill.

One of the spokes P is colored differently from the rest, preferably black, so that it can be very readily distinguished from the rest.

The operation is as follows: When the instrument is to be used for measuring, the free ends of the arms M are raised to form continuations of the side bars, C, as shown in the dotted lines in Fig. 1, the board O resting against the under edges of the side bars, C. The said arms M are then used as handles, and the instrument is trundled in the same manner as a wheelbarrow. The wheel A is so adjusted that the outer end of the colored spoke P is at the starting-point of the distance to be measured. When the wheel A has made one revolution, the pointer of the dial $a'$ moves one subdivision of the dial, which is divided into twenty parts. One rod will then have been measured. When the wheel A has been revolved twenty times, twenty rods will have been measured, at which time the gong J will sound, and so on, and the pointer on the dial $a^2$ will have moved one subdivision, said dial being divided into sixteen equal parts. When the pointer of the dial $a^2$ has made one revolution, one mile will have been measured, and the pointer of the dial $a^3$ will have moved one subdivision, the said dial being divided into ten equal parts. When the pointer of the dial $a^3$ has made one revolution, ten miles will have been measured, and the pointer of the dial $a^4$ is moved one subdivision, the said dial being divided into ten equal parts. When the pointer of the dial $a^4$ has made one revolution, one hundred miles will have been measured. By counting and observing the colored spoke P, any odd number of revolutions of the wheel can be taken. The distances are recorded automatically. There is no counting to be done, or, at least, but very little, as the record taken from the several dials at the beginning, being taken from or subtracted from the record taken from the dials at the end of measurement or any intermediate point, will give distance measured to a link distant. No pins or chains are required, and the distance need only be traversed once by the surveyor. When the surveyor wishes to take observations with his compass, the arms M are swung down, and serve as supports for the shafts or side bars, C.

The tape-line is used for measuring distances across streams and gulches and leveling up steep declivities.

The front spoke, at right angles with the colored spoke, is divided into links and numbered, counting from the center of the wheel, 1 2 3 4, to the outer end. The side bars, C, are also divided into links, and numbered from the center of the wheel, and running continuously backward to the end of the handle M. This is done for convenience in lifting the machine over obstructions, such as logs, fences, &c., taking its distance when being carried as well as when running.

Having thus described my invention, what I claim as new, and desire to secure by Letters Patent, is—

1. The combination, with an odometer, of a wheel journaled between two shafts, having a rim divided into equal parts and one spoke of different color from the rest, whereby the number of revolutions of the wheel may be recorded, as described.

2. In a geodometer, the combination, with the wheel A, the shafts or side bars, C, and the odometer H, of the board D, uniting the shafts, the staff K, attached to the board D, provided at its upper end with a pin, upon which the ball and socket belonging to any compass staff or tripod can be attached to receive the compass or transit at will, and of the pin $g$ on the board D, substantially as herein shown and described, and for the purpose set forth.

3. In a geodometer, with the wheel A, the rim F, being one rod in extent, and divided into twenty-five equal parts, called "links," and numbered as herein shown, the spoke at right angles with black spoke, together with the left-hand side bar, C, and arm M, being divided into links distance, and numbered to take the distance in lifting the machine over logs and fences, with tape-line to take distances across streams and gulches and to level in measuring up steep declivities, in combination with all other essential facts herein described, and each for its purpose set forth.

SAMUEL DEWELL.

Witnesses:
CHAS. W. ODEN,
W. H. ROBERTSON.